(12) United States Patent
Okamura et al.

(10) Patent No.: US 11,171,346 B2
(45) Date of Patent: Nov. 9, 2021

(54) FUEL CELL SYSTEM

(71) Applicant: HONDA MOTOR CO., LTD., Tokyo (JP)

(72) Inventors: Yuji Okamura, Wako (JP); Tetsuya Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 16/264,716

(22) Filed: Feb. 1, 2019

(65) Prior Publication Data

US 2019/0252701 A1 Aug. 15, 2019

(30) Foreign Application Priority Data

Feb. 9, 2018 (JP) .............................. JP2018-021511

(51) Int. Cl.
*H01M 8/04291* (2016.01)
*H01M 8/04701* (2016.01)
*F16K 49/00* (2006.01)

(52) U.S. Cl.
CPC ......... *H01M 8/04291* (2013.01); *F16K 49/00* (2013.01); *F16K 49/002* (2013.01); *H01M 8/04716* (2013.01)

(58) Field of Classification Search
CPC .............................. F16K 49/00; F16K 49/002
See application file for complete search history.

(56) References Cited

U.S. PATENT DOCUMENTS

| | | | |
|---|---|---|---|
| 2010/0112404 A1 | 5/2010 | Yamagishi et al. | |
| 2010/0261079 A1 | 10/2010 | Kells et al. | |
| 2010/0323252 A1* | 12/2010 | Kobayashi | H01M 8/04388 429/415 |
| 2011/0014534 A1* | 1/2011 | Sung | H01M 8/04231 429/429 |
| 2016/0169411 A1* | 6/2016 | Fahrner | B64D 15/12 137/15.18 |

FOREIGN PATENT DOCUMENTS

| | | |
|---|---|---|
| CN | 101647147 | 2/2010 |
| CN | 101874324 | 10/2010 |
| JP | 4654569 | 1/2005 |
| WO | WO 2015/021627 | * 2/2015 |

OTHER PUBLICATIONS

Chinese Office Action for Chinese Patent Application No. 201910107344.5 dated Sep. 8, 2021.

* cited by examiner

*Primary Examiner* — Anca Eoff
(74) *Attorney, Agent, or Firm* — Amin, Turocy & Watson, LLP

(57) ABSTRACT

A fuel cell system includes a gas liquid separator and a valve device. The gas liquid separator separates water from a fuel off gas discharged from a fuel cell stack. The valve device is provided in a discharge channel for discharging water separated from the gas liquid separator. The valve device includes a fluid inlet for guiding fluid at least containing water in the gas liquid separator toward the valve main body. A heating device is provided at an inner hole of the fluid inlet.

14 Claims, 9 Drawing Sheets

FUEL CELL SYSTEM

CROSS-REFERENCE TO RELATED APPLICATION

This application is based upon and claims the benefit of priority from Japanese Patent Application No. 2018-021511 filed on Feb. 9, 2018, the contents of which are incorporated herein by reference.

BACKGROUND OF THE INVENTION

Field of the Invention

The present invention relates to a fuel cell system including a fuel cell for performing power generation by electrochemical reactions of a fuel gas and an oxygen-containing gas.

Description of the Related Art

In a fuel cell system disclosed in Japanese Patent No. 4,654,569, a valve device is provided in a channel where an off gas containing water discharged from a fuel cell, and a positive temperature coefficient (PTC) heater is provided for a shaft and a seal portion of the valve device. In such a fuel cell system, freezing of the valve device is prevented by heating the shaft and the seal portion using the PTC heater to evaporate the water attached to the shaft and the seal portion.

SUMMARY OF THE INVENTION

However, in the above described technique, since the PTC heater needs to be provided for the shaft and the seal portion of the valve device, structure of the valve device may be complicated. Further, the heat produced by the PTC heater tends to be radiated from the shaft and the seal portion to the outside through the body of the valve device. Therefore, it is not possible to effectively suppress freezing of the valve device. In the event that the valve device is frozen, it may not be possible to defrost the frozen valve device rapidly.

The present invention has been made taking the above problem into consideration, and an object of the present invention is to provide a fuel cell system having simple structure in which it is possible to suppress freezing of the valve device effectively, and even if freezing of the valve device occurs, it is possible to defrost the frozen valve device rapidly.

In order to achieve the above object, a fuel cell system according to the present invention includes a fuel cell configured to generate power by electrochemical reactions of a fuel gas and an oxygen-containing gas, a fuel gas supply apparatus configured to supply the fuel gas into the fuel cell, an oxygen-containing gas supply apparatus configured to supply the oxygen-containing gas into the fuel cell, an outlet channel as a passage of an off gas containing water discharged from the fuel cell, a gas liquid separator provided in the outlet channel, and configured to separate the water from the off gas, a discharge channel for discharging water separated by the gas liquid separator, and a valve device disposed in the discharge channel. The valve device includes a valve main body for opening and closing the discharge channel, a fluid inlet for guiding fluid containing at least water, in the gas liquid separator toward the valve main body, and a fluid outlet for discharging the fluid guided from the valve main body. A heating device is provided at an inner hole of the fluid inlet.

In the structure, since the heating device is provided at the inner hole of the fluid inlet, it is possible to directly heat the fluid (off gas and water) guided from the gas liquid separator to the valve main body by the heating device, and keep the inner hole of the fluid inlet at a temperature higher than the freezing temperature. Accordingly, it is possible to heat the valve main body efficiently. Therefore, with the simple structure, it is possible suppress freezing of the valve device effectively, and even if the valve device is frozen, it is possible to defrost the frozen valve device rapidly.

In the fuel cell system, the fluid inlet may have an opening for allowing the fluid to flow from the gas liquid separator into an inner hole of the fluid inlet, the heating device may include a heating element and a cover positioned below the opening, and for containing the heating element, and the cover may have an upper hole opened upward of the cover, and for allowing the fluid to flow into an inner hole of the cover and an outlet hole for allowing the fluid at the inner hole of the cover to flow toward the valve main body.

In the structure, the fluid which has flowed from the gas liquid separator into the inner hole of the fluid inlet through the opening flows into the cover through the upper hole, and the fluid is heated by the heating element. Therefore, in the state where the flow rate of the fluid guided by the valve main body is restricted by the cover, it is possible to heat the fluid efficiently.

In the fuel cell system, the fluid inlet may be provided at a bottom of the gas liquid separator.

In the structure, it is possible to simplify the structure of the valve device and the gas liquid separator.

In the fuel cell system, the cover may have a fluid passage opened in a direction other than the upward direction, and the fluid passage may be configured to allow water vapor present between the cover and the fluid inlet to flow into the inner hole of the cover.

In the structure, the valve main body can be heated by the water vapor which has flowed from the fluid passage into the inner hole of the cover more efficiently.

In the fuel cell system, the fluid passage may be opened downward, and positioned on one side of the upper hole opposite to the outlet hole.

In the structure, the water vapor present between cover and the fluid inlet can flow from the fluid passage into the inner hole of the cover efficiently. Further, it is possible to prevent or reduce the situation where the water which has flowed from the upper hole into the inner hole of the cover flows out of the cover through the fluid passage.

In the fuel cell system, the cover may include a cover main body having the upper hole for covering the heating element, and an outlet having the outlet hole provided for the cover main body. The channel cross sectional area of the outlet may be larger than the channel cross sectional area of the cover main body.

In the structure, it is possible to suppress local heating of the valve main body by the fluid guided by the outlet.

In the fuel cell system, the heating element may be a PTC heater.

In the structure, with simple control, it is possible to regulate the temperature of the heating element to reach the target temperature.

The fuel cell system may include a heater control unit configured to control electrical power supplied to the PTC heater, a resistance value acquisition unit configured to obtain a resistance value of the PTC heater, and a resistance value determination unit configured to determine whether or not the heater resistance value obtained by the resistance value acquisition unit is not less than a target resistance value. At the time of starting operation of the fuel cell system, in the state where electrical power is supplied to the PTC heater, if the resistance value determination unit determines that the heater resistance value is less than the target resistance value, the heater control unit may increase electrical power supplied to the PTC heater.

In the structure, even in the case where the valve device is frozen at the time of starting operation of the fuel cell system, with the simple control, it is possible to defrost the frozen valve device by the PTC heater rapidly.

The fuel cell system may include a fuel cell temperature acquisition unit configured to obtain temperature of the fuel cell, a heater temperature calculation unit configured to calculate temperature of the PTC heater based on the heater resistance value, and a temperature determination unit configured to determine whether or not the temperature difference calculated by subtracting the fuel cell temperature obtained by the fuel cell temperature acquisition unit from the heater temperature calculated by the heater temperature calculation unit is not less than a predetermined temperature. If the temperature determination unit determines that the temperature difference is not less than the predetermined temperature, the heater control unit may stop supply of electrical power to the PTC heater.

In the structure, after the fluid is heated sufficiently by the PTC heater, supply of electrical power to the PTC heater is stopped. Therefore, it is possible to reliably defrost the valve main body, and reduce the quantity of electrical power consumed by the PTC heater.

The fuel cell system may include a valve control unit configured to control the valve device in a manner that the discharge channel is opened and closed, a heater control unit configured to control electrical power supplied to the PTC heater, a resistance value acquisition unit configured to obtain a resistance value of the PTC heater, a heater temperature calculation unit configured to calculate temperature of the PTC heater based on the heater resistance value obtained by the resistance value acquisition unit, a fuel cell temperature acquisition unit configured to obtain temperature of the fuel cell, and a temperature determination unit configured to determine whether or not the temperature difference calculated by subtracting the fuel cell temperature obtained by the fuel cell temperature acquisition unit from the heater temperature calculated by the heater temperature calculation unit is not more than a water discharge determination value. During normal operation of the fuel cell system, in the state where electrical power is supplied to the PTC heater, if the temperature determination unit determines that the heater temperature is not more than the water discharge determination value, the valve control unit may perform valve opening control of the valve device in a manner that the discharge channel is opened.

In the water discharge control of the fuel cell system, if water is retained in the gas liquid separator during normal operation of the fuel cell system, since the heating device contacts the water, the temperature of the PTC heater is low. Therefore, the temperature difference calculated by subtracting the fuel cell temperature from the heater temperature becomes relatively small. On the other hand, if no water is retained in the gas liquid separator, the heating device contacts gases such as the off gas. Therefore, the temperature of the PTC heater is high. As a result, the temperature difference becomes relatively large. Further, in the above structure, if the temperature difference is not more than the water discharge determination value, valve opening control of the valve device is performed. Thus, with the simple control, it is possible to reliably discharge the water retained in the gas liquid separator.

The fuel cell system may include a resistance value determination unit configured to determine whether or not the heater resistance value is higher than a predetermined threshold value, and after elapse of predetermined time from the valve opening control, valve closing control of the valve device is performed in a manner that the discharge channel is closed, and thereafter, if the resistance value determination unit determines that the heater resistance value is higher than the predetermined threshold value, the valve control unit may perform valve opening control of the valve device in a manner that the discharge channel is opened.

For example, when the fuel cell system is mounted in a vehicle, etc., it happens sometimes that the water surface in the gas liquid separator is inclined from the horizontal direction due to the behaviors of the vehicle. In this case, when the heating device is exposed outside from the water surface, even if some water remains in the gas liquid separator, the valve device is closed. However, in the above structure, after the valve closing control of the valve device is performed, if the heater resistance value is higher than the predetermined threshold value, the valve opening control of the valve device is performed again. Therefore, even in the case where the water surface in the gas liquid separator is inclined from the horizontal direction, it is possible to reliably discharge the water in the gas liquid separator.

The fuel cell system may include a control unit, and operation of the control unit may be started at predetermined time intervals after operation of the fuel cell system is stopped. The control unit may include a valve control unit configured to control the valve device in a manner that the discharge channel is opened and closed, a heater control unit configured to control electrical power supplied to the PTC heater, a resistance value acquisition unit configured to obtain a resistance value of the PTC heater, a heater temperature calculation unit configured to calculate temperature of the PTC heater based on the heater resistance value obtained by the resistance value acquisition unit, and a temperature determination unit configured to determine whether or not the heater temperature calculated by the heater temperature calculation unit is not more than a freezing threshold value. In the state where operation of the fuel cell system is stopped, when operation of the control unit is started, if the temperature determination unit determines that the heater temperature is not more than the freezing threshold value, the valve control unit may perform valve opening control of the valve device in a manner that the discharge channel is opened.

In the structure, with the simple control, even if the water is produced by condensation in the valve device during operation of the fuel cell system, it is possible to reliably discharge the condensed water before it is frozen.

In the fuel cell system, the heating element may be positioned below the opening.

In the fuel cell system, the heating element may be positioned on one side of the fluid passage opposite to the outlet hole.

In the fuel cell system, the outer surface of the outlet may be configured to contact the inner surface of the fluid inlet.

In the present invention, since the heating device is provided at the inner hole of the fluid inlet, with the simple structure, it is possible to suppress freezing of the valve device effectively, and even if freezing of the valve device occurs, it is possible to defrost the frozen valve device rapidly.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell system according to the present invention will be described with reference to the accompanying drawings.

Figure 1:
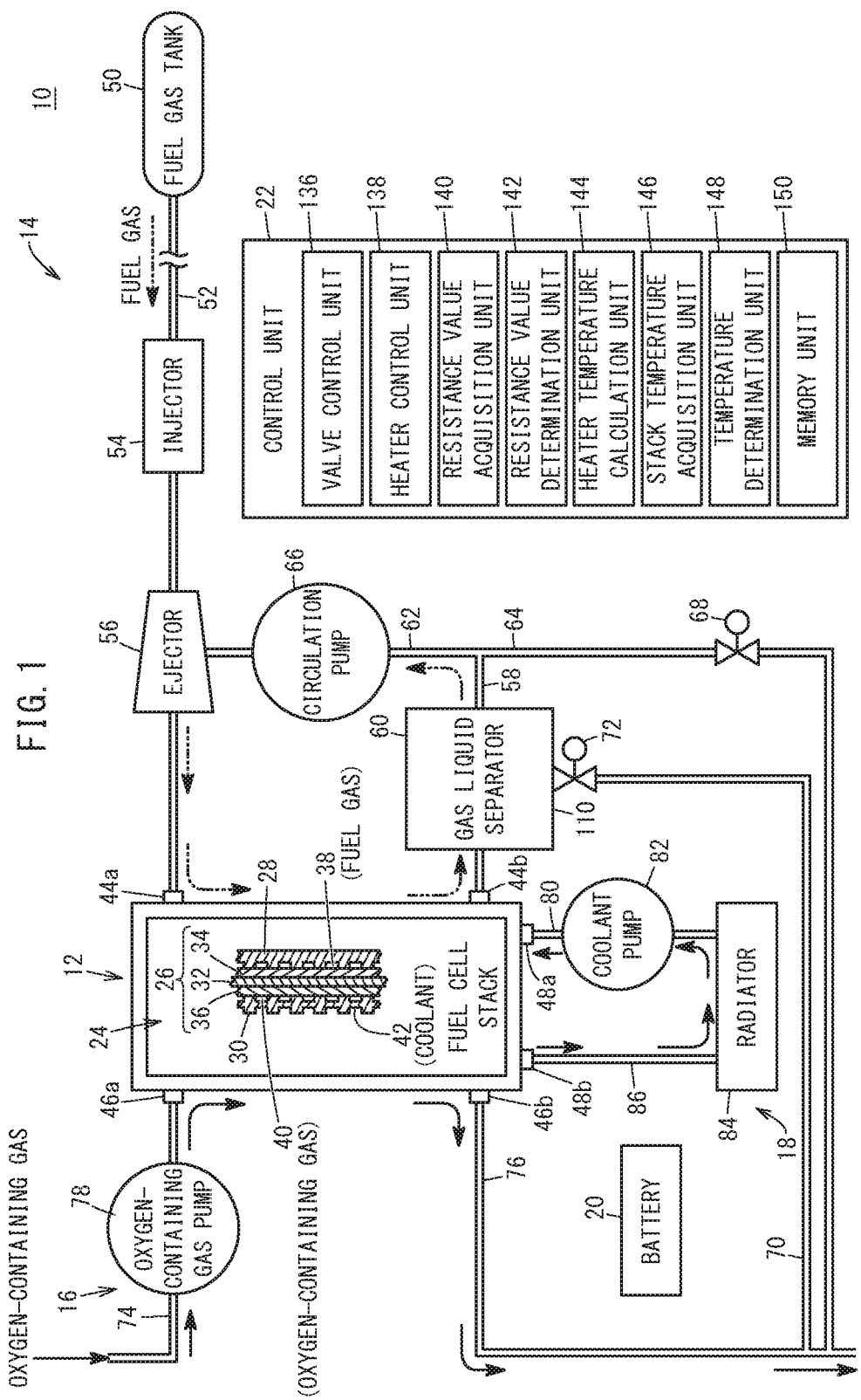
FIG. 1 is a diagram schematically showing structure of a fuel cell system according to an embodiment of the present invention.

A fuel cell system 10 according to an embodiment of the present invention shown in FIG. 1 is mounted in a fuel cell vehicle (not shown) such as a fuel cell electric automobile.

The fuel cell system 10 includes a fuel cell stack 12 (fuel cell). A fuel gas supply apparatus 14, an oxygen-containing gas supply apparatus 16, and a coolant supply apparatus 18 are provided for the fuel cell stack 12. The fuel gas supply apparatus 14 supplies a fuel gas such as a hydrogen gas. The oxygen-containing gas supplies an oxygen-containing gas such as the air, and the coolant supply apparatus 18 supplies a coolant. Further, the fuel cell system 10 includes a battery 20 as a power storage device, and a control unit 22.

The fuel cell stack 12 includes a plurality of power generation cells 24 stacked together in a horizontal direction. Each of the power generation cells 24 is formed by sandwiching a membrane electrode assembly 26 between a first separator 28 and a second separator 30. The first separator 28 and the second separator 30 are metal separators or carbon separators.

The membrane electrode assembly 26 includes a solid polymer electrolyte membrane 32, and anode 34 and a cathode 36 on both sides of the solid polymer electrolyte membrane 32. For example, the solid polymer electrolyte membrane 32 is a thin membrane of perfluorosulfonic acid containing water. A fluorine based electrolyte may be used as the solid polymer electrolyte membrane 32. Alternatively, an HC (hydrocarbon) based electrolyte may be used as the solid polymer electrolyte membrane 32.

A fuel gas flow field 38 is formed between the first separator 28 and the membrane electrode assembly 26. The fuel gas flow field 38 guides the fuel gas to flow along the anode 34. An oxygen-containing gas flow field 40 is formed between the second separator 30 and the membrane electrode assembly 26. The oxygen-containing gas flow field 40 supplies the oxygen-containing gas to the cathode 36. A coolant flow field 42 is provided between the first separator 28 and the second separator 30 that are adjacent to each other. The coolant flow field 42 is a flow channel of the coolant.

The fuel cell stack 12 has a fuel gas inlet 44a, a fuel gas outlet 44b, an oxygen-containing gas inlet 46a, an oxygen-containing gas outlet 46b, a coolant inlet 48a, and a coolant outlet 48b. The fuel gas inlet 44a extends through each of the power generation cells 24 in the stacking direction, and the fuel gas inlet 44a is connected to the inlet side of the fuel gas flow field 38. The fuel gas outlet 44b extends through each of the power generation cells 24 in the stacking direction, and the fuel gas outlet 44b is connected to the outlet side of the fuel gas flow field 38. The fuel gas flow field 38, the fuel gas inlet 44a, and the fuel gas outlet 44b form an anode channel.

The oxygen-containing gas inlet 46a extends through each of the power generation cells 24, and the oxygen-containing gas inlet 46a is connected to the inlet side of the oxygen-containing gas flow field 40. The oxygen-containing gas outlet 46b extends through each of the power generation cells 24 in the stacking direction, and the oxygen-containing gas outlet 46b is connected to the outlet side of the oxygen-containing gas flow field 40. The oxygen-containing gas flow field 40, the oxygen-containing gas inlet 46a, and the oxygen-containing gas outlet 46b form a cathode channel.

The coolant inlet 48a extends through each of the power generation cells 24 in the staking direction, and the coolant inlet 48a is connected to the inlet side of the coolant flow field 42. The coolant outlet 48b extends through each of the power generation cells 24, and the coolant outlet 48b is connected to the outlet side of the coolant flow field 42.

The fuel gas supply apparatus 14 includes a fuel gas tank 50 for storing a high pressure fuel gas (high pressure hydrogen), and the fuel gas tank 50 is connected to the fuel gas inlet 44a of the fuel cell stack 12 through a fuel gas supply channel 52. The fuel gas supply channel 52 supplies a fuel gas to the fuel cell stack 12.

An injector 54 and an ejector 56 are provided in the fuel gas supply channel 52. The injector 54 injects the fuel gas guided from the fuel gas tank 50 toward the downstream side. The ejector 56 generates a negative pressure in the fuel gas injected from the injector 54 by Venturi effect, and sucks the fuel off gas in a circulation channel 62 described later, mixes the fuel off gas with the fuel gas, and discharge the mixed gas toward the downstream side.

A fuel gas discharge channel 58 (outlet channel) is connected to the fuel gas outlet 44b of the fuel cell stack 12. After some of the fuel gas is consumed at the anode 34, the fuel gas is discharged as the fuel off gas (fuel exhaust gas) from the fuel cell stack 12 through the fuel gas discharge channel 58. A gas liquid separator 60 is provided in the fuel gas discharge channel 58. The gas liquid separator 60 separates water (water produced in reaction) from the fuel off gas, and retains the separated water. The gas liquid separator 60 is provided adjacent to the fuel cell stack 12. Therefore, the heat produced in the fuel cell stack 12 is transmitted to the gas liquid separator 60.

A circulation channel 62 and a purge channel 64 are connected to a downstream end of a fuel gas discharge channel 58. The fuel off gas is guided to the ejector 56 through the circulation channel 62. A circulation pump 66 is provided in the circulation channel 62. By operation of the circulation pump 66, in particular, at the time of starting up the fuel cell stack 12, the fuel off gas discharged into the fuel gas discharge channel 58 passes through the circulating channel 62, and the fuel off gas is circulated into the fuel gas supply channel 52.

A purge valve 68 is provided in the purge channel 64. A discharge channel 70 for discharging water separated by the gas liquid separator 60 is provided at the bottom 110 of the gas liquid separator 60. A valve device 72 for opening and closing the discharge channel 70 is provided in the discharge channel 70. Specific structure of the valve device 72 will be described later.

The oxygen-containing gas supply apparatus 16 includes an oxygen-containing gas supply channel 74 connected to the oxygen-containing gas inlet 46a of the fuel cell stack 12, and an oxygen-containing gas discharge channel 76 connected to the oxygen-containing gas outlet 46b of the fuel cell stack 12.

An oxygen-containing gas pump 78 for compressing the oxygen-containing gas (atmospheric air) and supplying the oxygen-containing gas is provided in the oxygen-containing gas supply channel 74. The oxygen-containing gas is supplied from the oxygen-containing gas supply channel 74 into the fuel cell stack 12. After at least some of the oxygen-containing gas is consumed at the cathode 36, the oxygen-containing gas is discharged as the oxygen-containing off gas, from the fuel cell stack 12 into the oxygen-containing gas discharge channel 76.

The coolant supply apparatus 18 includes a coolant supply channel 80 connected to the coolant inlet 48a of the fuel cell stack 12. A coolant pump 82 is provided in the coolant supply channel 80. The coolant supply channel 80 is connected to the radiator 84, and a coolant discharge channel 86 is connected to a radiator 84. The coolant discharge channel 86 is connected to the coolant outlet 48b.

Figure 2:
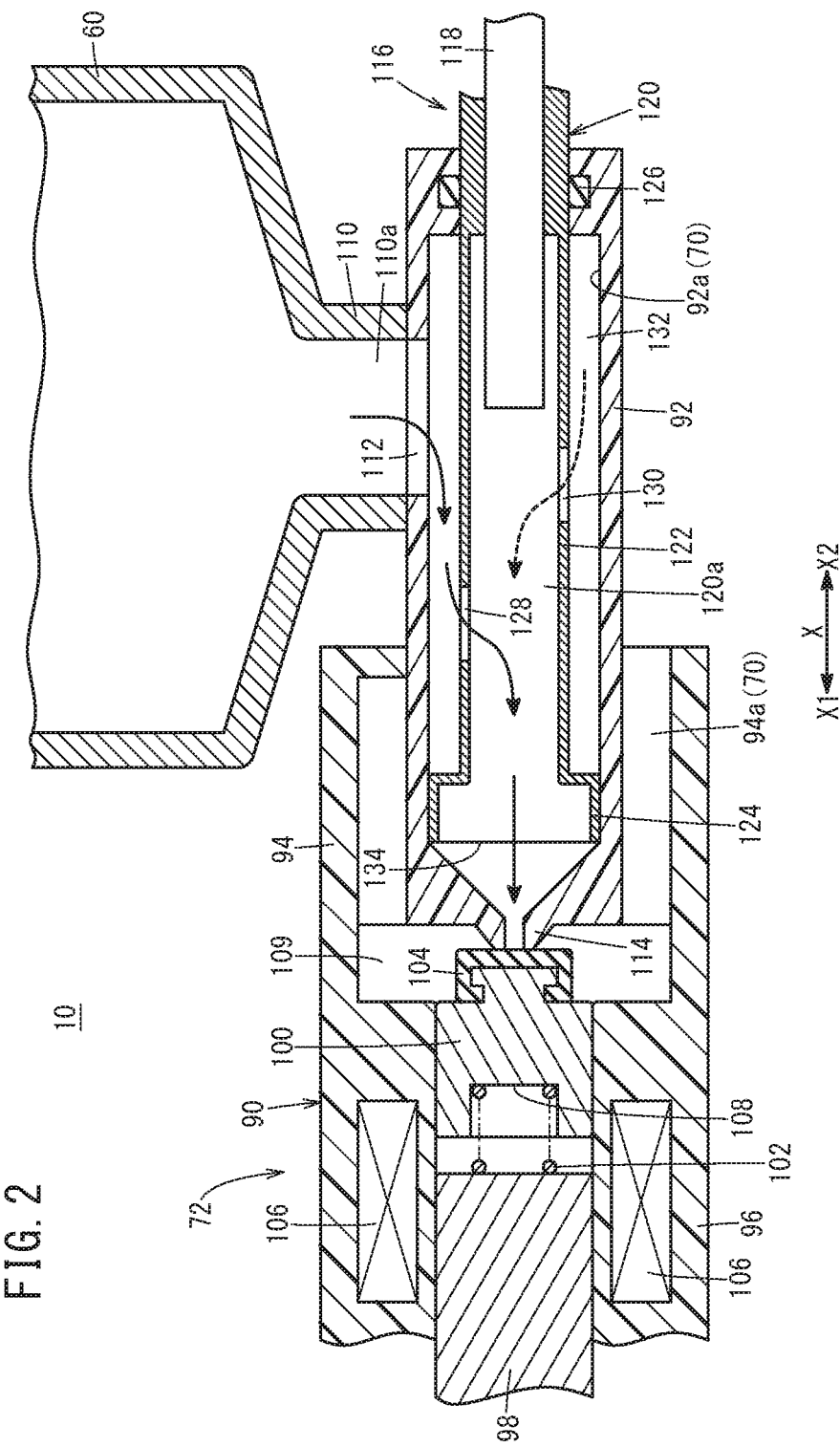
FIG. 2 is a vertical cross sectional view with partial omission showing a gas liquid showing a gas liquid separator, a valve device, and a heating device.

As shown in FIG. 2, the valve device 72 is provided at the bottom 110 of the gas liquid separator 60. The valve device 72 includes a valve main body 90, a fluid inlet 92, and a fluid outlet 94.

The valve main body 90 includes a hollow valve body 96, a fixed core 98, a movable core 100, a spring 102, a valve plug 104, and a solenoid 106. The fixed core 98 and the movable core 100 are provided in the valve body 96. The fixed core 98 and the movable core 100 are arranged in a direction indicated by an arrow X. The movable core 100 is made of magnetic material such as iron. The movable core 100 moves in the direction indicated by the arrow X.

A recess 108 is formed at one end of the movable core 100 in a direction indicated by an arrow X1. The spring 102 for biasing the movable core 100 in a direction indicated by an arrow X2 is formed in the recess 108. The valve plug 104 is provided at the other end of the movable core 100 in the direction indicated by the arrow X2, and positioned in a valve chamber 109 of the valve body 96. Electrical current from the control unit 22 is supplied to the solenoid 106 provided for the valve body 96.

The fluid inlet 92 guides fluid containing at least water in the gas liquid separator 60 toward the valve main body 90. The fluid inlet 92 extends in the direction indicated by the arrow X, and the fluid inlet 92 is provided at the bottom 110 of the gas liquid separator 60.

The fluid inlet 92 is provided below (vertically below) the bottom 110 of the gas liquid separator 60. An opening 112 is formed in the fluid inlet 92. The opening 112 guides fluid in the gas liquid separator 60 toward an inner hole 92a of the fluid inlet 92. That is, the opening 112 connects a discharge port 110a at the bottom 110 of the gas liquid separator 60 and the inner hole 92a of the fluid inlet 92. A valve seat 114 is provided at one end of the fluid inlet 92 (end in the direction indicated by the arrow X1). The valve plug 104 is seated on the valve seat 114.

Fluid guided from the valve main body 90 (valve chamber 109) is discharged through the fluid outlet 94. The fluid outlet 94 is provided for the valve body 96 in a manner that the fluid outlet 94 covers one end of the fluid inlet 92. The inner hole 92a of the fluid inlet 92, the valve chamber 109, and the inner hole 94a of the fluid outlet 94 form part of the discharge channel 70.

In the valve device 72, when electrical current is supplied from the control unit 22 to the solenoid 106, the movable core 100 is displaced by excitation operation of the solenoid 106, toward the side where the fixed core 98 is present (in the direction indicated by the arrow X1). As a result, the valve plug 104 is spaced from the valve seat 114. Therefore, the discharge channel 70 is opened.

On the other hand, when supply of electrical current from the control unit 22 to the solenoid 106 is interrupted, the movable core 100 is displaced by a biasing force of the spring 102 in the direction indicated by the arrow X2. As a result, since the valve plug 104 is seated on the valve seat 114, the discharge channel 70 is closed.

In the embodiment of the present invention, a heating device 116 is provided at the inner hole 92a of the fluid inlet 92, and the heating device 116 heats fluid guided from the gas liquid separator 60. The heating device 116 includes a PTC heater 118 (PTC: Positive Temperature Coefficient) as a heating element, and a cover 120 containing the PTC heater 118. The PTC heater 118 extends in the direction indicated by the arrow X, and the PTC heater 118 is positioned below the opening 112. The PTC heater 118 produces heat using electrical power supplied from the control unit 22.

Figure 3:
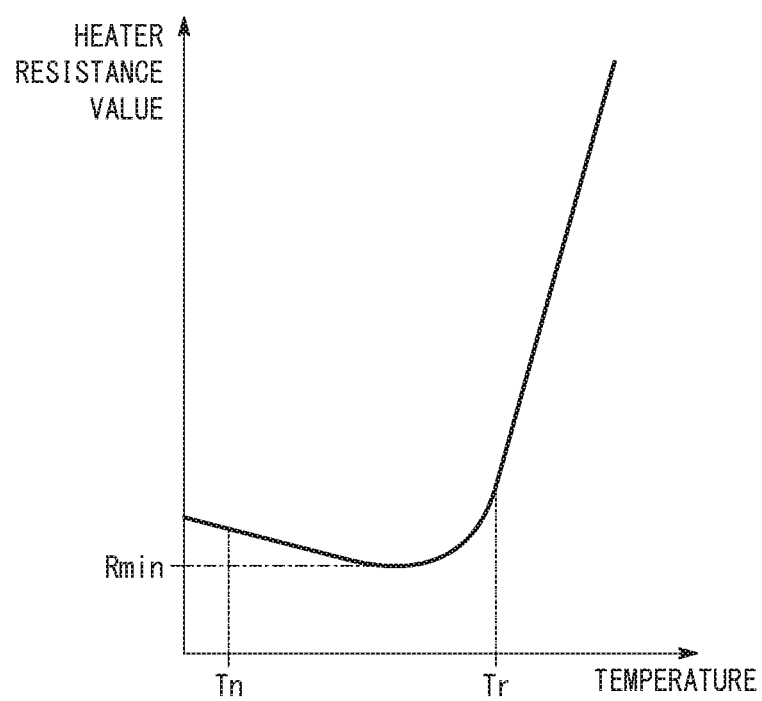
FIG. 3 is a graph showing the relationship between the temperature and the resistance value of a PTC heater.

As shown in FIG. 3, the electrical resistance value of the PTC heater 118 increases sharply when the temperature exceeds a predetermined temperature Tr. That is, the PTC heater 118 has a self temperature control function. In FIG. 3, the vertical axis denotes the logarithm of the electrical resistance value (heater resistance value) of the PTC heater 118. The heater resistance value has the minimum resistance value Rmin between the normal temperature Tn (25° C.) and the setting temperature Tr.

In FIG. 2, the cover 120 includes a cover main body 122 in the form of a tube, and an outlet 124. The cover main body 122 extends in the direction indicated by the arrow X, and in this state the cover main body 122 covers the PTC heater 118. The outlet 124 is provided at one end of the cover main body 122 in the direction indicated by the arrow X1. The cover main body 122 is supported by the other end of the fluid inlet 92. A seal member 126 is attached to the other end of the fluid inlet 92. The seal member 126 contacts the outer surface of the cover main body 122 in a liquid tight and air tight manner.

The cover main body 122 is positioned below the opening 112. The outer diameter of the cover main body 122 is smaller than the inner diameter of the fluid inlet 92. An upper hole 128 and a fluid passage 130 are formed in a cover main body 122. The upper hole 128 is opened upward of the cover main body 122. Fluid guided from the gas liquid separator 60 flows into an inner hole 120a of the cover 120. The upper hole 128 is positioned on one side of the opening 112 and the PTC heater 118 closer to the valve seat 114 in the direction indicated by the arrow X1.

The fluid passage 130 is opened toward a position below the cover main body 122. The fluid passage 130 connects the space (external space 132) outside the cover 120 and the inner hole 120a of the cover 120, in the inner hole 92a of the fluid inlet 92. The fluid passage 130 is positioned on one side of the upper hole 128, in the direction opposite to the valve seat 114 (indicated by the arrow X2). Stated otherwise, an end of the fluid passage 130 in the direction indicated by the arrow X1 is positioned on a side shifted in the direction indicated by the arrow X2 from the end of the upper hole 128 in the direction indicated by the arrow X2. The fluid passage 130 is provided at a position shifted from the PTC heater 118 in the direction indicated by the arrow X1.

The outlet 124 is formed in an annular shape. An outlet hole 134 is formed at an end of the outlet 124 in the direction indicated by the arrow X1. The fluid in the inner hole 120a of the cover 120 is guided through the outlet hole 134 toward the valve main body 90. The outlet hole 134 is opened toward the direction indicated by the arrow X1. The PTC heater 118 is provided on one side of the fluid passage 130 opposite to the outlet hole. The outer diameter of the outlet 124 is substantially the same as the inner diameter of the fluid inlet 92. That is, the outer surface of the outlet 124 contacts the inner surface of the fluid inlet 92. The channel sectional area of the outlet 124 is larger than the channel sectional area of the cover main body 122.

In FIG. 1, the control unit 22 is a computation machine including a microcomputer. The control unit 22 includes a CPU (central processing unit), a ROM, and a RAM as memories. The CPU reads, and executes programs retained in the ROM to function as a unit for realizing various functions ((various) function realizing unit). It should be noted that the various function realizing unit is made up of devices which realize these functions as hardware.

The control unit 22 includes a valve control unit 136, a heater control unit 138, a resistance value acquisition unit 140, a resistance value determination unit 142, a heater temperature calculation unit 144, a stack temperature acquisition unit 146 (fuel cell temperature acquisition unit), a temperature determination unit 148, and a memory unit 150.

The valve control unit 136 controls the valve device 72 in a manner that the discharge channel 70 is opened and closed. The heater control unit 138 controls electrical power supplied to the PTC heater 118. The resistance value acquisition unit 140 obtains the resistance value of the PTC heater 118. The resistance value determination unit 142 determines whether or not the heater resistance value obtained by the resistance value acquisition unit 140 satisfies a predetermined condition.

The heater temperature calculation unit 144 calculates the temperature (heater temperature) of the PTC heater 118 based on the heater resistance value. The stack temperature acquisition unit 146 obtains the temperature of the fuel cell stack 12 (hereinafter referred to as the "stack temperature"). The temperature determination unit 148 determines whether or not the heater temperature and the stack temperature (fuel cell temperature) satisfied a predetermined condition.

Operation of the fuel cell system 10 having the above structure will be described below. The oxygen-containing gas is supplied into the fuel cell stack 12 through the oxygen-containing gas supply channel 74. After some of the oxygen-containing gas has been consumed at the cathode 36, the oxygen-containing gas is discharged as the oxygen-containing off gas from the fuel cell stack 12 through the oxygen-containing gas discharge channel 76.

In FIG. 1, in the fuel gas supply apparatus 14, the fuel gas supplied from the fuel gas tank 50 to the fuel gas supply channel 52 is supplied to the fuel gas inlet 44a through the injector 54 and the ejector 56. The fuel gas supplied to the fuel gas inlet 44a flows into the fuel gas flow field 38, and moves along the fuel gas flow field 38. Thus, the fuel gas is supplied to the anode 34 of the membrane electrode assembly 26.

In FIG. 1, in the oxygen-containing gas supply apparatus 16, the oxygen-containing gas is supplied to the oxygen-containing gas supply channel 74 under rotation operation of the oxygen-containing gas pump 78. The oxygen-containing gas is supplied to the oxygen-containing gas inlet 46a of the fuel cell stack 12. The oxygen-containing gas flows from the oxygen-containing gas inlet 46a into the oxygen-containing gas flow field 40, and moves along the oxygen-containing gas flow field 40. Thus, the oxygen-containing gas is supplied to the cathode 36 of the membrane electrode assembly 26.

Thus, in each of the membrane electrode assemblies 26, the fuel gas supplied to the anode 34 and the oxygen in the oxygen-containing gas supplied to the cathode 36 are consumed in electrochemical reactions in the electrode catalyst layers to generate electricity. In this regard, protons are produced at the anode 34. The protons are transmitted through the solid polymer electrolyte membrane 32 toward the cathode 36. In the meanwhile, at the cathode 36, the protons, electrons, and the oxygen in the oxygen-containing gas produce water. The produced water permeates through the solid polymer electrolyte membrane 32, and reaches the anode 34. Therefore, the produced water is present in the fuel cell stack 12 (anode channel).

Further, in the coolant supply apparatus 18, under operation of the coolant pump 82, a coolant such as pure water, ethylene glycol, oil is supplied from the coolant supply channel 80 to the coolant inlet 48a of the fuel cell stack 12. The coolant flows along the coolant flow field 42 to cool the power generation cell 24. Thereafter, the coolant is discharged from the coolant outlet 48b to the coolant discharge channel 86.

Then, after the fuel gas is supplied to the anode 34, and some of the fuel gas is consumed at the anode 34, the fuel gas containing water (produced water) is discharged as the off gas, from the fuel gas outlet 44b into the gas liquid separator 60 through the fuel gas discharge channel 58. In the gas liquid separator 60, the water is separated from the fuel off gas. The separated water is retained in the gas liquid separator 60. After the water is separated from the fuel off gas, the fuel off gas flows from the gas liquid separator 60 into the ejector 56 through the circulation channel 62. After the fuel off gas flows into the ejector 56, by operation of the negative pressure generated by discharging the fuel gas from the injector 54 to the ejector 56, the fuel off gas is sucked into the ejector 56, and mixed with the fuel gas.

As necessary, the fuel off gas discharged into the fuel gas discharge channel 58 is discharged (purged) to the outside under operation of opening the purge valve 68. Likewise, after the oxygen-containing gas is supplied to the cathode 36, and some of the oxygen-containing gas is consumed at the cathode 36, the oxygen-containing gas is discharged from the oxygen-containing gas outlet 46b into the oxygen-containing gas discharge channel 76.

Next, low temperature start-up control of the fuel cell system 10 according to the embodiment of the present invention (start-up control below the freezing temperature) will be described below.

Figure 4:
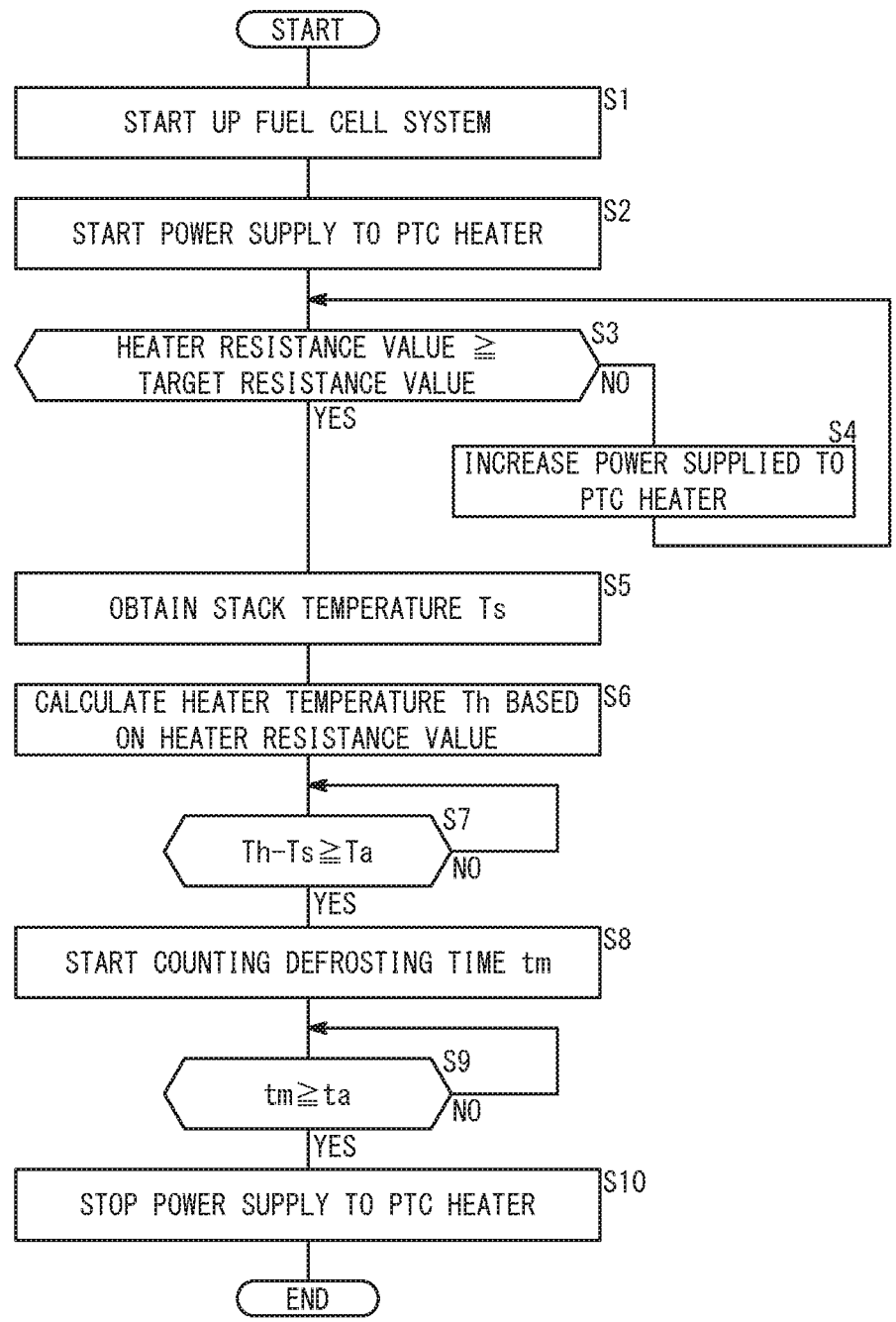
FIG. 4 is a flow chart showing low temperature start-up control of a fuel cell system.
Figure 5:
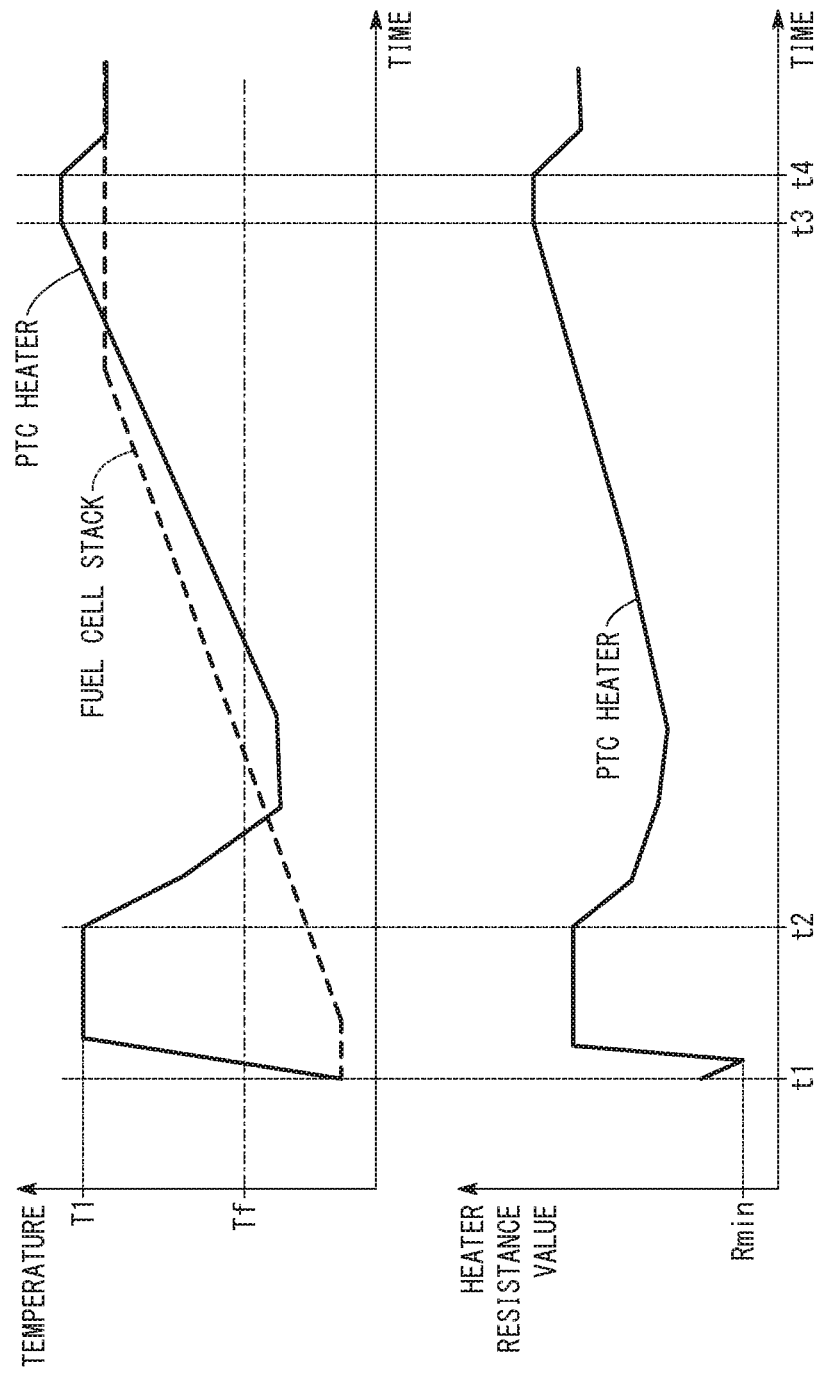
FIG. 5 is a graph showing the low temperature start-up control of the fuel cell system.

Firstly, with reference to FIGS. 4 and 5, at the time point t1, the control unit 22 starts up the fuel cell system 10 (step S1). Further, substantially at the same time, the heater control unit 138 starts supply of electrical power to the PTC heater 118 (step S2).

Then, the fuel cell stack 12 is warmed up by power generation, and heat is generated by the PTC heater 118. Therefore, as shown in FIG. 5, the temperature of the fuel cell stack 12 (stack temperature) and the temperature of the PTC heater 118 (heater temperature) are increased. At this time, the PTC heater 118 is kept at a predetermined temperature T1 which is higher than the freezing temperature Tf. It should be noted that the resistance value (heater resistance value) of the PTC heater 118 is decreased to the lowest resistance value Rmin, and thereafter, increased.

Further, at the time of starting operation of the fuel cell stack 12 at low temperature, the produced water having relatively low temperature is present in the fuel cell stack 12, and the fuel off gas containing the water is guided toward the gas liquid separator 60. In the gas liquid separator 60, water is separated from the fuel off gas. Then, as shown in FIG. 2, the separated water flows through the discharge port 110a and the opening 112 at the bottom 110 of the gas liquid separator 60, and flows into the inner hole 92a of the fluid inlet 92.

Specifically, after the water flows into the inner hole 92a of the fluid inlet 92, the fuel gas is dropped together with the fuel off gas onto the upper surface of the cover main body 122, and flows in the direction indicated by the arrow X1. Then, the water flows from the upper hole 128 into the lower hole 120a of the cover 120. The fluid (the water and the fuel off gas) which has flowed into the inner hole 120a of the cover 120 flows in the direction indicated by the arrow X1, and the fluid is guided into the valve main body 90 (the valve seat 114 and the valve plug 104) through the outlet hole 134.

At this time, the water which has flowed into the inner hole 92a of the fluid inlet 92 is heated by the PTC heater 118. Stated otherwise, the water which has flowed into the inner hole 92a of the fluid inlet 92 at the time point t2 in FIG. 5 contacts the heating device 116. As a result, the heater temperature and the heater resistance value are decreased. For example, the heater temperature is lower than the freezing temperature Tf and the stack temperature.

Then, in FIG. 4, the resistance value determination unit 142 determines whether or not the heater resistance value is not less than the target resistance value (step S3). The heater resistance value is obtained by the resistance value acquisition unit 140. The target resistance value is retained in a memory unit 150 beforehand. For example, the target resistance value may be set to a heater resistance value which enables the heater to have the sufficient temperature to, if the valve device 72 is frozen, defrost the frozen valve device 72.

In the case where the resistance value determination unit 142 determines that the heater resistance value is less than the target resistance value (step S3: NO), the heater control unit 138 increases the electrical power supplied to the PTC heater 118 (step S4). Thus, the heater temperature is increased rapidly, and the heater temperature becomes higher than the freezing temperature Tf and the stack temperature.

Therefore, the fluid in the inner hole 92a of the fluid inlet 92 is heated to the freezing temperature Tf or more by the PTC heater 118. Further, since external space 132 is heated by the PTC heater 118, the water vapor in the external space 132 flows into the inner hole 120a of the cover 120 through the fluid passage 130 (see FIG. 2). Thus, the frozen valve main body 90 (the valve plug 104 and the valve seat 114) are heated efficiently by the fluid discharged from the cover 120. After the process in step S4, the processes in step S3 and the subsequent steps are performed again.

If the resistance value determination unit 142 determines that the heater resistance value is not less than the target resistance value (step S3: YES), the stack temperature acquisition unit 146 obtains the stack temperature Ts (step S5). Further, the heater temperature calculation unit 144 calculates the heater temperature Th based on the heater resistance value (step S6).

Specifically, the heater temperature calculation unit 144 calculates the heater temperature Th based on the heater resistance value, e.g., with reference to a graph shown in FIG. 3. It should be noted that this graph is retained in the memory unit 150 beforehand. In the graph of FIG. 3, two temperatures are obtained from one heater resistance value. Therefore, the heater temperature calculation unit 144 selects the temperature which is higher than the stack temperature Ts, as the heater temperature Th, from the two obtained temperatures.

Thereafter, in FIG. 4, the temperature determination unit 148 determines whether or not the temperature calculated by subtracting the stack temperature Ts from the heater temperature Th is not less than the predetermined temperature Ta (step S7). If the temperature determination unit 148 determines that the temperature difference calculated by subtracting the stack temperature Ts from the heater temperature Th is less than the predetermined value (step S7: NO), the process of step S7 is performed again.

If the temperature determination unit 148 determines that the temperature difference calculated by subtracting the stack temperature Ts from the heater temperature Th is not less than the predetermined temperature Ta (step S7: YES), the control unit 22 starts counting of the defrosting time tm (step S8, see the time point t3 in FIG. 5). Then, the control unit 22 determines whether or not the defrosting time tm has reached the predetermined time ta or more (step S9).

If the defrosting time tm has not reached the predetermined time ta (step S9: NO), the process of step S9 is performed again. If the defrosting time tm has reached the predetermined time ta or more (step S9: YES), the heater control unit 138 stops supply of electrical power to the PTC heater 118 (step S10, see the time point t4 in FIG. 5). Thus, since the fluid guided from the gas liquid separator 60 into the inner hole 120a of the cover 120 is heated sufficiently by the PTC heater 118, the valve main body 90 is rapidly defrosted rapidly. Thereafter, the low temperature start-up control of the fuel cell system 10 is finished.

Next, water discharge control of the fuel cell system 10 according to the embodiment of the present invention will be described.

Figure 6:
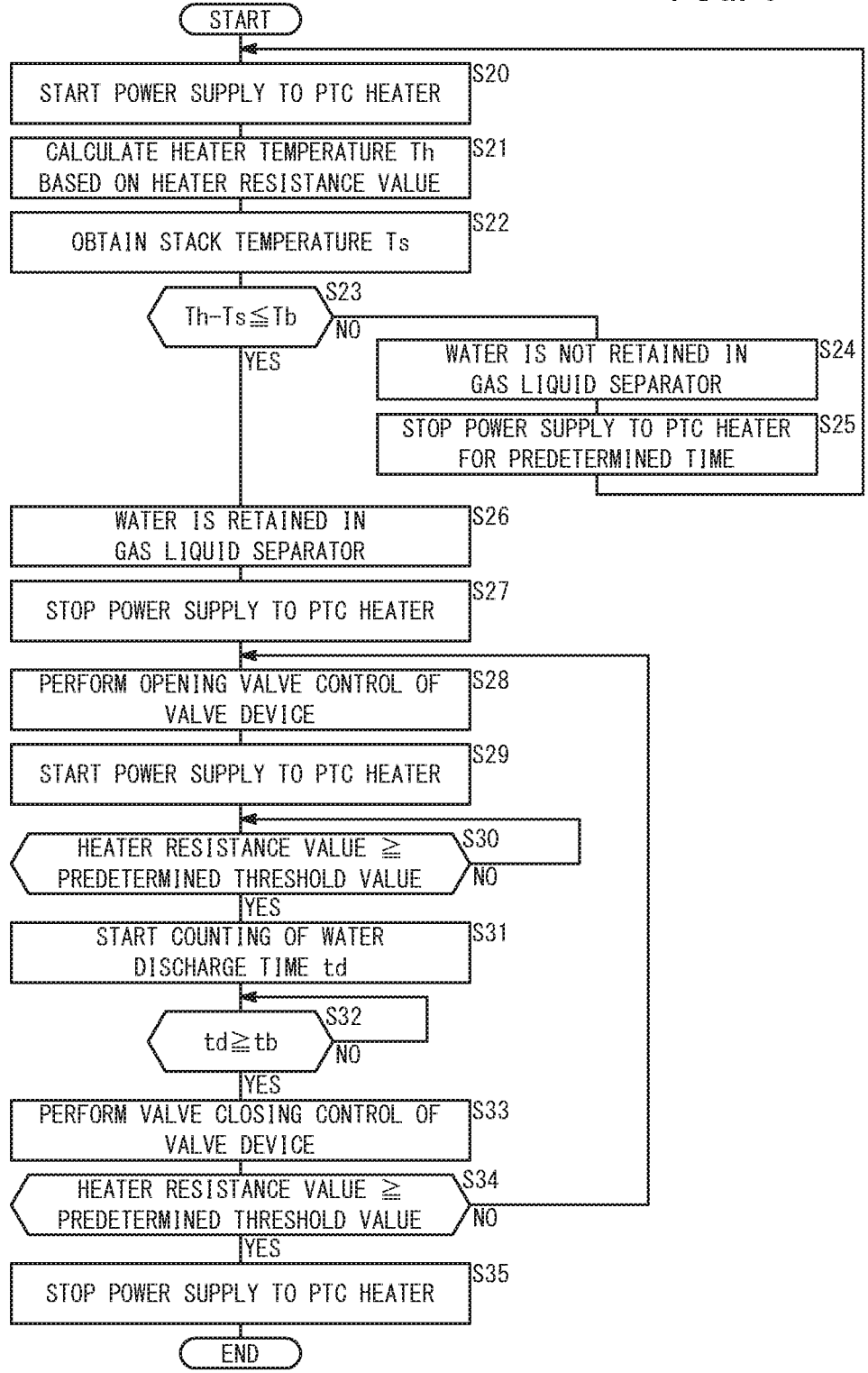
FIG. 6 is a flow chart showing water discharge control of the fuel cell system.
Figure 7:
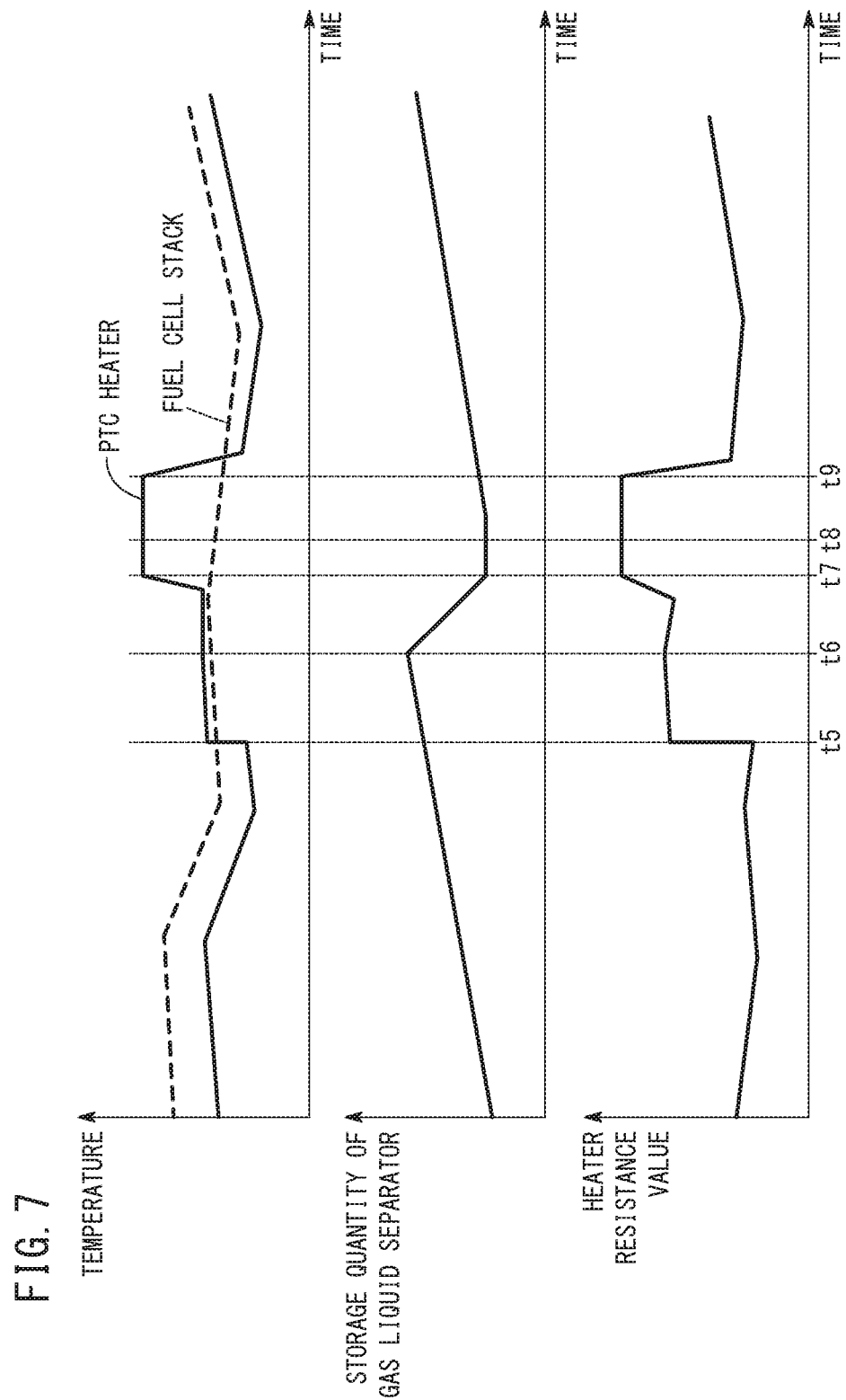
FIG. 7 is a graph showing water discharge control of the fuel cell system.

Firstly, with reference to FIGS. 6 and 7, at the time point t5, the heater control unit 138 starts supply of electrical power to the PTC heater 118 (step S20).

Then, the heater temperature calculation unit 144 calculates the heater temperature Th based on the heater resistance value (step S21). The heater resistance value is obtained by the resistance value acquisition unit 140. For example, the heater temperature calculation unit 144 calculates the heater temperature Th based on the heater resistance value, e.g., with reference to the graph shown in FIG. 3. Further, the stack temperature acquisition unit 146 obtains the stack temperature Ts (step S22).

Thereafter, the temperature determination unit 148 determines whether or not the temperature difference calculated by subtracting the stack temperature Ts from the heater temperature Th is not more than the water discharge determination value Tb (step S23). The water discharge determination value Tb is retained in the memory unit 150 beforehand.

In this regard, in the case where a significant quantity of water which may cause water submergence of the heating device 116 is retained in the gas liquid separator 60, since the heat of the PTC heater 118 is transmitted to the water having large specific heat, the heater temperature Th becomes a relatively low temperature (e.g., temperature which is substantially the same as the stack temperature). Therefore, temperature difference calculated by subtracting the stack temperature Ts from the heater temperature Th becomes relatively low. On the other hand, in the case where no water is retained in the gas liquid separator 60, or the water level of water retained in the gas liquid separator 226 is so small that the heating device 116 is exposed to the outside from the water surface, the heat of the PTC heater 118 is transmitted to the gas having small specific heat. Therefore, the heater temperature Th becomes relatively high (temperature in correspondence with the supplied electrical power). Thus, the temperature difference calculated by subtracting the stack temperature Ts from the heater temperature Th becomes relatively large.

If the temperature determination unit 148 determines that the temperature difference calculated by subtracting the stack temperature Ts from the heater temperature Th is larger than the water discharge determination value Tb (step S23: NO), the control unit 22 determines that water is not retained in the gas liquid separator 60 (step S24). Then, the heater control unit 138 stops supply of electrical power to the PTC heater 118 for predetermined time (step S25). Thereafter, the processes in step S20 and the subsequent steps are performed again.

If the supply of electrical power to the PTC heater 118 is not stopped, when the quantity of water produced in the fuel cell stack 12 is very small, the water guided from the gas liquid separator 60 to the valve device 72 is evaporated by the PTC heater 118. Therefore, the supply of electrical power to the PTC heater 118 is stopped for predetermined time, and the heating device 116 is submerged in the water.

Further, the temperature difference between the heater temperature when heat is received from the fuel cell stack 12 in the state where water is not retained in the gas liquid separator 60 and the heater temperature when supply of electrical power to the PTC heater 118 is started should be checked. In this manner, it is possible improve the accuracy of estimating the quantity of water retained in the gas liquid separator 60. However, in the case where the influence of the heat transferred from the fuel cell stack 12 to the PTC heater 118 is negligible, in consideration of the temperature and the heater characteristics of the fuel cell system 10, electrical power may be supplied to the PTC heater 118 all the time.

If the temperature determination unit 148 determines that the temperature difference obtained by subtracting the stack temperature Ts from the heater temperature Th is not more than the water discharge determination value Tb (step S23: YES), the control unit 22 determines that water is retained in the gas liquid separator 60 (step S26).

Then, the heater control unit 138 stops supply of electrical power to the PTC heater 118 (step S27). Thereafter, the valve control unit 136 controls the valve device 72 to open the discharge channel 70 (step S28, the time point t6 in FIG. 7). Thus, the water in the gas liquid separator 60 is discharged downstream of the valve device 72 in the discharge channel 70.

Then, the heater control unit 138 starts supply of electrical power to the PTC heater 118 (step S29). As a result, when the heating device 116 is exposed outside from the water surface after water discharge, the heater temperature and the heater resistance value are increased in correspondence with the increase in the quantity of electrical power supplied to the PTC heater 118.

Then, the resistance value determination unit 142 determines whether or not the heater resistance value is not less than the predetermined threshold value (step S30). If the resistance value determination unit 142 determines that the heater resistance value is smaller than the predetermined threshold value (step S30: NO), the process of step S30 is performed again. It is because the water in the gas liquid separator 60 has not been discharged sufficiently.

If the resistance value determination unit 142 determines that the heater resistance value is not less than the predetermined threshold value (step S30: YES, see the time point t7 in FIG. 7), the control unit 22 starts measuring water discharge time td (step S31). Then, the control unit 22 determines whether or not the water discharge time td has reached the predetermined time to or more (step S32).

If the water discharge time td has not reached the predetermined time tb (step S32: NO), the process of step S32 is performed again. If the water discharge time td has reached the predetermined time tb or more (step S32: YES), the valve control unit 136 performs valve closing control of the valve device 72 in a manner that the discharge channel 70 is closed (step S33, see the time point t8 in FIG. 7). In this manner, the water in the gas liquid separator 60 is discharged reliably toward the downstream side of the valve device 72.

Then, the resistance value determination unit 142 determines whether or not the heater resistance value is not less than the predetermined threshold value (step S34). If the resistance value determination unit 142 determines that the heater resistance value is smaller than the predetermined threshold value (step S34: NO), the processes in step S28 and the subsequent steps are performed again.

In the case where the water surface in the gas liquid separator 60 is inclined from the horizontal direction due to behaviors of the vehicle, since the heating device 116 is exposed outside from the water surface, it happens sometimes that the valve device 72 is closed in the state where some water remains in the gas liquid separator 60. However, since the valve device 72 is opened again in the case where the heater resistance value is not less than the predetermined threshold value, even if the water surface is inclined from the horizontal direction due to behaviors of the vehicle, the water in the gas liquid separator 60 is discharged reliably.

If the resistance value determination unit 142 determines that the heater resistance value is not less than the predetermined threshold value (step S34: YES), the heater control unit 138 stops supply of electrical power to the PTC heater 118 (step S35, see the time point t9 in FIG. 7). Thereafter, the water discharge control of the fuel cell system 10 is finished.

Next, low temperature operation stop control of the fuel cell system 10 will be described.

Figure 8:
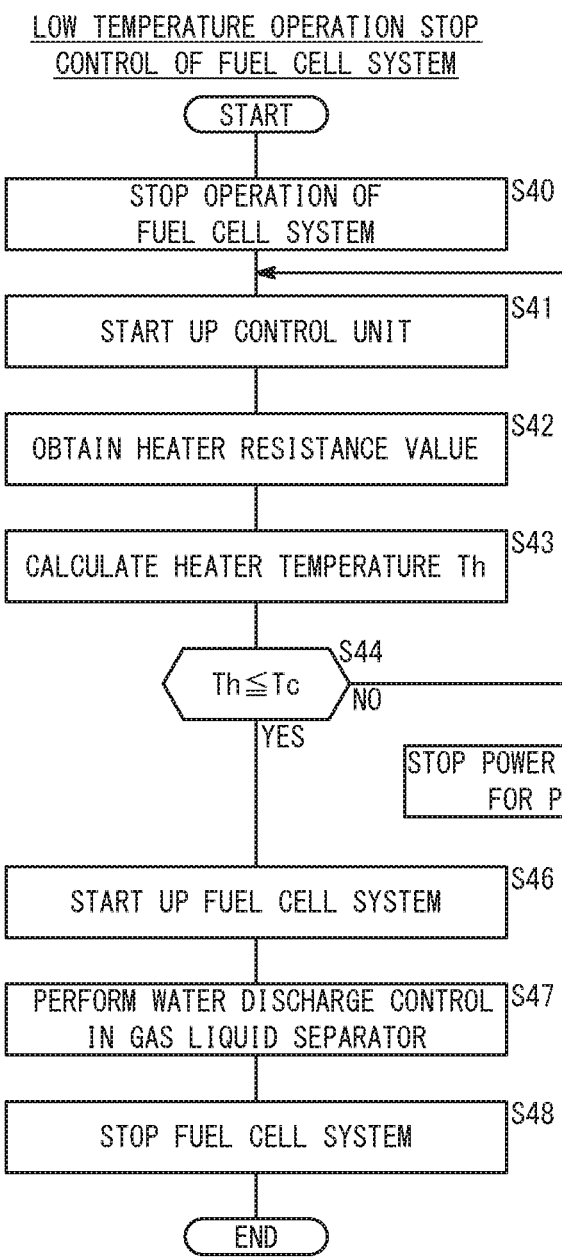
FIG. 8 is a flow chart showing low temperature operation stop control of the fuel cell system.
Figure 9:
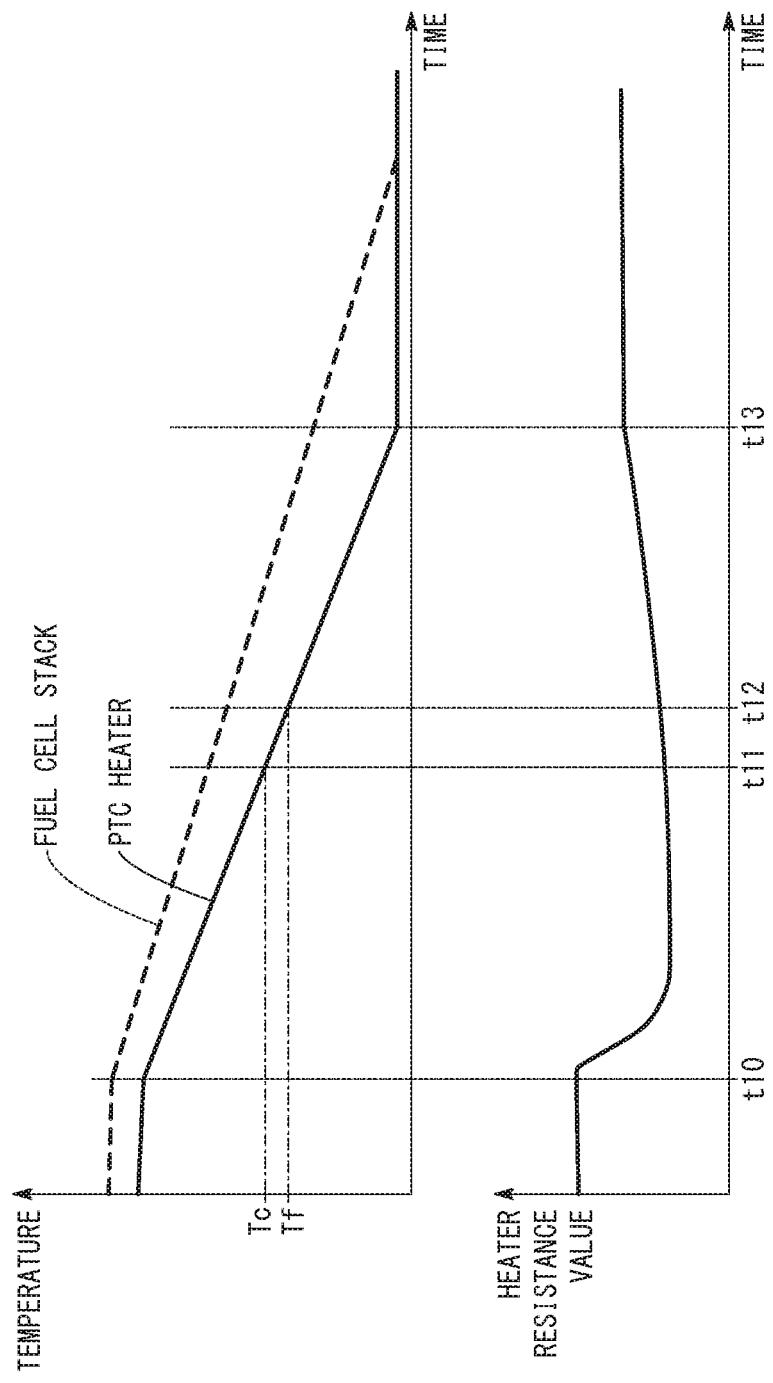
FIG. 9 is a graph showing the low temperature operation stop control of the fuel cell system.

Firstly, with reference to FIGS. 8 and 9, at the time point t10, the control unit 22 stops operation of the fuel cell system 10 (step S40). During operation of the fuel cell system 10, the stack temperature and the temperature in the system of peripheral auxiliary devices change closely to each other. Therefore, it is possible to recognize the heater temperature with reference to the temperatures of the coolant, the fuel gas and the oxygen-containing gas in the fuel cell stack 12.

When operation of the fuel cell system 10 is stopped, supply of the fuel gas and the oxygen-containing gas to the fuel cell stack 12 is stopped, and supply of electrical power to the control unit 22 is stopped. Thus, as shown in FIG. 9, the stack temperature and the heater temperature are decreased.

Then, after elapse of predetermined time from step S40, the control unit 22 is started up (step S41). Then, the resistance value acquisition unit 140 obtains the heater resistance value (step S42), and the heater temperature calculation unit 144 calculates the heater temperature Th based on the heater resistance value (step S43). In this regard, since no electrical power is supplied to the PTC heater 118, if the PTC heater 118 is placed under the ambient temperature environment for a sufficient period of time, the temperatures of the internal space of the PTC heater 118 and the surface of the PTC heater 118 become substantially the same. Therefore, by supplying very small electrical current to the PTC heater 118 to obtain the heater resistance value, and calculating the heater temperature Th based on the heater resistance value, it is possible to recognize the temperature in the auxiliary device system.

For example, the heater temperature calculation unit 144 calculates the heater temperature Th based on the heater resistance value with reference to a graph shown in FIG. 3. In this case, by using the area of the temperature which is higher than the predetermined temperature Tr (linear area) in the graph of FIG. 3, it becomes possible to perform water discharge control at the optimum temperature and timing where some condensed water is retained.

Then, the temperature determination unit 148 determines whether or not the heater temperature Th is not more than the freezing threshold value Tc (step S44). The freezing threshold value Tc is retained in the memory unit 150 beforehand, and set at a temperature which is higher than the freezing temperature Tf. If the temperature determination unit 148 determines that the heater temperature Th is higher than the freezing threshold Tc (step S44: NO), after supply of electrical power to the control unit 22 is stopped for predetermined time (step S45), the processes in step S41 and the subsequent steps are performed again. It should be noted that the drop gradient of the heater temperature may be calculated, and the timing of starting operation of the control unit 22 the next time may be determined.

If the temperature determination unit 148 determines that the heater temperature Th is not more than the freezing threshold value Tc (step S44: YES, the time point t11 in FIG. 9), the fuel cell system 10 is started up (step S46).

Then, the control unit 22 performs water discharge control in the gas liquid separator 60 (step S47). Specifically, the valve control unit 136 performs valve opening control of the valve device 72 in a manner that the discharge channel 70 is opened. As a result, water in the gas liquid separator 60 is discharged.

As shown in FIG. 9, since the heat capacity of the fuel cell stack 12 is relatively large, after stopping operation of the fuel cell system 10, the auxiliary devices may reach the freezing temperature Tf, before the fuel cell stack 12 reaches the freezing temperature Tf. For the purpose of preventing freezing in the auxiliary device system, it is necessary to discharge condensed water in the state where the temperatures of the auxiliary devices are higher than the freezing temperature Tf. However, in the case of performing the water discharge process with reference to the stack temperature Ts, at the time of performing the water discharge process, it happens sometimes that the temperatures of the auxiliary devices have already reached the freezing temperature Tf or less.

However, since the water discharge control is performed in the case where the heater temperature Th is not more than the freezing threshold value Tc, it is possible to reliably discharge the condensed water before the temperatures of the auxiliary devices reach the freezing temperature Tf. That is, since no water remains in the valve device 72 when the heater temperature Th reaches the freezing temperature Tf (see the time point t12 in FIG. 9), freezing of the valve main body 90 does not occur.

Thereafter, the control unit 22 stops operation of the fuel cell system 10 (step S48, see the time point t13 in FIG. 9). As a result, the low temperature operation stop control of the fuel cell system 10 is finished.

Next, advantages of the fuel cell system 10 according to the embodiment of the present invention will be described below.

The valve device 72 includes the valve main body 90, the fluid inlet 92 and the fluid outlet 94. The fluid inlet 92 guides fluid at least containing water in the gas liquid separator 60, toward the valve main body 90. The fluid guided from the valve main body 90 is discharged through the fluid outlet 94. The heating device 116 is provided at the inner hole 92a of the fluid inlet 92.

In the structure, the fluid guided from the gas liquid separator 60 to the valve main body 90 (fuel off gas and water) can be heated directly by the heating device 116, and the inner hole 92a of the fluid inlet 92 can be kept at a temperature higher than the freezing temperature. In this manner, it is possible to heat the valve main body 90 efficiently. Thus, with simple structure, it is possible to effectively suppress freezing of the valve device 72, and even if freezing of the valve device 72 occurs, it is possible to defrost the frozen water promptly.

The fluid inlet 92 has the opening 112 for allowing fluid from the gas liquid separator 60 to flow into the inner hole 92a of the fluid inlet 92. The heating device 116 includes the PTC heater 118 and the cover 120. The cover 120 is provided below the opening 112, and contains the PTC heater 118. The cover 120 has the upper hole 128 and the outlet hole 134. The upper hole 128 is opened to a position above the cover 120, and guides the fluid into the inner hole 120a of the cover 120. The fluid in the inner hole 120a of the cover 120 is guided through the outlet hole 134 toward the valve main body 90.

In the structure, the fluid which has flowed from the gas liquid separator 60 into the inner hole 92a of the fluid inlet 92 through the opening 112 flows into the inner hole 120a of the cover 120 through the upper hole 128, and the fluid is heated by the PTC heater 118. Therefore, in the state where the flow rate of the fluid guided by the valve main body 90 is restricted by the cover 120, the fluid can be heated efficiently.

The fluid inlet 92 is provided at the bottom 110 of the gas liquid separator 60. Therefore, it is possible to simplify the structure of the valve device 72 and the gas liquid separator 60.

The cover 120 has the fluid passage 130 which is opened downward. The water vapor present between the cover 120 and the fluid inlet 92 (external space 132) flows into the inner hole 120a of the cover 120 through the fluid passage 130. In the structure, the valve main body 90 can be heated by the water vapor which has flowed from the fluid passage 130 into the inner hole 120a of the cover 120 efficiently to a greater extent.

The fluid passage 130 is provided on one side of the upper hole 128 opposite to the outlet hole 134. In the structure, the water vapor present in the external space 132 can flow from the fluid passage 130 into the inner hole 120a of the cover 120 efficiently. Further, it is possible to eliminate or reduce the situation where the water which has flowed from the upper hole 128 into the inner hole 120a of the cover 120 flows out of the cover 120 through the fluid passage 130.

The cover 120 includes the cover main body 122 and the outlet 124. The cover main body 122 covers the PTC heater 118, and an upper hole 128 is formed in the cover main body 122. The outlet 124 is provided in the cover main body 122, and has an outlet hole 134. The channel sectional area of the outlet 124 is larger than the channel sectional area of the cover main body 122. In the structure, it is possible to suppress local heating of the valve main body 90 by the fluid guided by the outlet 124.

The heating device 116 includes the PTC heater 118 as a heating element. Therefore, with simple control, it is possible to regulate the temperature of the PTC heater 118 to reach the target temperature.

In the low temperature start-up control of the fuel cell system 10, at the time of starting operation of the fuel cell system 10, in the state where electrical power is supplied to the PTC heater 118, if the resistance value determination unit 142 determines that the heater resistance value is less than the target resistance value, the heater control unit 138 increases electrical power supplied to the PTC heater 118.

In the structure, even in the case where the valve device 72 is frozen at the time of starting up the fuel cell system 10, with the simple control, it is possible to defrost the valve device 72 by the PTC heater 118 rapidly.

In the low temperature start-up control of the fuel cell system 10, if the temperature determination unit 148 determines that the temperature difference calculated by subtracting the stack temperature Ts from the heater temperature Th is not less than the predetermined temperature Ta, the heater control unit 138 stops supply of electrical power to the PTC heater 118.

Thus, in the state where the fluid which has flowed into the inner hole 92a from the gas liquid separator 60 into the inner hole 92a of the fluid inlet 92 is heated sufficiently, it is possible to stop supply of electrical power to the PTC heater 118. Therefore, it is possible to reliably defrost the frozen valve device 72, and reduce the quantity of electrical power consumed in the PTC heater 118.

In the water discharge control of the fuel cell system 10, if water is retained in the gas liquid separator 60 during normal operation of the fuel cell system 10, since the heating device 116 contacts the water, the temperature of the PTC heater 118 is low. Therefore, the temperature difference calculated by subtracting the stack temperature Ts from the heater temperature Th becomes relatively small. On the other hand, if no water is retained in the gas liquid separator 60, the heating device 116 contacts a gas such as the fuel off gas. Therefore, the temperature of the PTC heater 118 becomes high. As a result, the temperature difference becomes relatively large.

In the water discharge control of the fuel cell system 10, during normal operation of the fuel cell system 10, in the state where electrical power is supplied to the PTC heater 118, if the temperature determination unit 148 determines that the temperature difference calculated by subtracting the stack temperature Ts from the heater temperature Th is not more than the water discharge determination value Tb, the valve control unit 136 performs valve opening control of the valve device 72 in a manner that the discharge channel 70 is opened.

Thus, with the simple control, it is possible to reliably discharge the water in the gas liquid separator 60.

In the water discharge control of the fuel cell system 10, for example, when the fuel cell system 10 is mounted in a vehicle, etc., it happens sometimes that the water surface in the gas liquid separator 60 is inclined from the horizontal direction due to the behaviors of the vehicle. In this case, when the heating device 116 is exposed outside from the water surface, even if some water is retained in the gas liquid separator 60, the valve device 72 is closed. However, after the valve closing control of the valve device 72 is performed, if the heater resistance value is higher than the predetermined threshold value, the valve opening control of the valve device 72 is performed again. Therefore, even in the case where the water surface in the gas liquid separator 60 is inclined from the horizontal direction, it is possible to reliably discharge the water in the gas liquid separator 60.

In the low temperature operation stop control of the fuel cell system 10, when the control unit 22 is started up in the state where operation of the fuel cell system 10 is stopped, if the temperature determination unit 148 determines that the heater temperature Th is not more than the freezing threshold value, Tc the valve control unit 136 performs valve opening control of the valve device 72 in a manner that the discharge channel 70 is opened. In this manner, with the simple control, before freezing of the condensed water produced in the valve device 72 during operation of the fuel cell system 10, it is possible to reliably discharge the condensed water.

The present invention is not limited to the above described structure. A plurality of upper holes 128 and a plurality of fluid passages 130 may be provided. The fluid passage 130 may be opened toward the lateral side of the cover main body 122. That is, it is sufficient that the fluid passage 130 is opened toward the direction other than the upward direction. Further, the fluid passage 130 may be provided with a filter which blocks the flow of water, and permits the flow of water vapor. The heating element of the heating device 116 is not limited to the PTC heater 118.

The gas liquid separator 60 for removing water from the oxygen-containing off gas (off gas) may be provided in the oxygen-containing gas discharge channel 76. The valve device 72 equipped with the heating device 116 may be provided at the bottom 110 of the gas liquid separator 60.

The fuel cell system according to the present invention is not limited to above described embodiments. It is a matter of course that various structures may be adopted without departing from the gist of the present invention.

What is claimed is:

1. A fuel cell system comprising:
   a fuel cell configured to generate power by electrochemical reactions of a fuel gas and an oxygen-containing gas;
   a fuel gas supply apparatus configured to supply the fuel gas into the fuel cell;
   an oxygen-containing gas supply apparatus configured to supply the oxygen-containing gas into the fuel cell;
   an outlet channel as a passage of an off gas containing water discharged from the fuel cell;
   a gas liquid separator provided in the outlet channel, and configured to separate the water from the off gas;
   a discharge channel for discharging water separated by the gas liquid separator; and
   a valve device disposed in the discharge channel, wherein the valve device comprises:
a valve main body for opening and closing the discharge channel;
a fluid inlet for guiding fluid containing at least water from the gas liquid separator toward the valve main body; and
a fluid outlet for discharging the fluid guided from the valve main body, and
wherein a heating device is provided at an inner hole of the fluid inlet;
the fluid inlet has an opening for allowing the fluid to flow from the gas liquid separator into the inner hole of the fluid inlet; and
the heating device comprises:
a heating element; and
a cover provided below the opening, and for containing the heating element, and
wherein the cover has
an upper hole opened upward of the cover, for allowing the fluid to flow into an inner hole of the cover and
an outlet hole for allowing the fluid at the inner hole of the cover to flow toward the valve main body.

2. The fuel cell system according to claim 1, wherein the fluid inlet is provided at a bottom of the gas liquid separator.

3. The fuel cell system according to claim 1, wherein the cover has a fluid passage opened in a direction other than upward, and the fluid passage allows water vapor present between the cover and the fluid inlet to flow into the inner hole of the cover.

4. The fuel cell system according to claim 3, wherein the fluid passage is opened downward, and positioned on one side of the upper hole opposite to the outlet hole.

5. The fuel cell system according to claim 3, wherein the heating element is positioned on one side of the fluid passage opposite to the outlet hole.

6. The fuel cell system according to claim 1, wherein the cover comprises:
a cover main body for covering the heating element, the cover main body having the upper hole; and
an outlet provided for the cover main body, the outlet having the outlet hole, and wherein the channel cross sectional area of the outlet is larger than the channel cross sectional area of the cover main body.

7. The fuel cell system according to claim 6, wherein the outer surface of the outlet is in contact with the inner surface of the fluid inlet.

8. The fuel cell system according to claim 1, wherein the heating element is a PTC heater.

9. The fuel cell system according to claim 8, comprising:
a heater control unit configured to control electrical power supplied to the PTC heater;
a resistance value acquisition unit configured to obtain a resistance value of the PTC heater; and
a resistance value determination unit configured to determine whether or not the heater resistance value obtained by the resistance value acquisition unit is not less than a target resistance value,
wherein at the time of starting up the fuel cell system, in a state where electrical power is supplied to the PTC heater, if the resistance value resistance value determines that the heater resistance value is less than the target resistance value, the heater control unit increases electrical power supplied to the PTC heater.

10. The fuel cell system according to claim 9, comprising:
a fuel cell temperature acquisition unit configured to obtain temperature of the fuel cell;
a heater temperature calculation unit configured to calculate temperature of the PTC heater based on the heater resistance value; and
a temperature determination unit configured to determine whether or not a temperature difference calculated by subtracting the fuel cell temperature obtained by the fuel cell temperature acquisition unit from the heater temperature calculated by the heater temperature calculation unit is not less than a predetermined temperature,
wherein if the temperature determination unit determines that the temperature difference is not less than a predetermined temperature, the heater control unit stops supply of electrical power to the PTC heater.

11. The fuel cell system according to claim 8, comprising:
a valve control unit configured to control the valve device in a manner that the discharge channel is opened and closed;
a heater control unit configured to control electrical power supplied to the PTC heater;
a resistance value acquisition unit configured to obtain a resistance value of the PTC heater;
a heater temperature calculation unit configured to calculate temperature of the PTC heater based on the heater resistance value obtained by the resistance value acquisition unit;
a fuel cell temperature acquisition unit configured to obtain temperature of the fuel cell; and
a temperature determination unit configured to determine whether or not a temperature difference calculated by subtracting the fuel cell temperature obtained by the fuel cell temperature acquisition unit from the heater temperature calculated by the heater temperature calculation unit is not more than a water discharge determination value,
wherein, during normal operation of the fuel cell system, in a state where electrical power is supplied to the PTC heater, if the temperature determination unit determines that the heater temperature is not more than the water discharge determination value, the valve control unit performs valve opening control of the valve device in a manner that the discharge channel is opened.

12. The fuel cell system according to claim 11, comprising a resistance value determination unit configured to determine whether or not the heater resistance value is higher than a predetermined threshold value,
wherein, after elapse of predetermined time from the valve opening control, valve closing control of the valve device is performed in a manner that the discharge channel is closed, and thereafter, if the resistance value determination unit determines that the heater resistance value is higher than the predetermined threshold value, the valve control unit performs valve opening control of the valve device in a manner that the discharge channel is opened.

13. The fuel cell system according to claim 8, comprising a control unit, the control unit being started up at predetermined time intervals after operation of the fuel cell system is stopped,
the control unit comprising:
a valve control unit configured to control the valve device in a manner that the discharge channel is opened and closed;
a heater control unit configured to control electrical power supplied to the PTC heater;
a resistance value acquisition unit configured to obtain a resistance value of the PTC heater;

a heater temperature calculation unit configured to calculate temperature of the PTC heater based on the heater resistance value obtained by the resistance value acquisition unit; and a temperature determination unit configured to determine whether or not the heater temperature calculated by the heater temperature calculation unit is not more than a freezing threshold value, wherein, in a state where operation of the fuel cell system is stopped, when operation of the control unit is started up, if the temperature determination unit determines that the heater temperature is not more than the freezing threshold value, the valve control unit performs valve opening control of the valve device in a manner that the discharge channel is opened.

14. The fuel cell system according to claim 1, wherein the heating element is positioned below the opening.

* * * * *